United States Patent [19]

Lewis

[11] Patent Number: 4,689,628
[45] Date of Patent: Aug. 25, 1987

[54] ADAPIVE SIDELOBE CANCELLER SYSTEM

[75] Inventor: Bernard L. Lewis, Oxon Hill, Md.

[73] Assignee: The United States of America as represented by the Secretary of the Navy, Washington, D.C.

[21] Appl. No.: 499,357

[22] Filed: Aug. 16, 1974

[51] Int. Cl.⁴ .......................... G01S 3/16; G01S 3/28
[52] U.S. Cl. .................................. 342/384; 342/381
[58] Field of Search ............... 343/100 LE, 100 CL; 325/371; 342/384, 381

[56] References Cited

U.S. PATENT DOCUMENTS

| 3,202,990 | 8/1965 | Howells | 343/100 LE |
| 3,881,177 | 4/1975 | Len et al. | 325/371 |
| 3,882,498 | 5/1975 | McGuffin | 343/100 CL |

Primary Examiner—Theodore M. Blum
Attorney, Agent, or Firm—John L. Forrest

[57] ABSTRACT

An improved signal processing technique for developing a plurality of independent samples, particularly for use in a canceller system receiving interference from a plurality of sources. Each of a plurality of signal channels sample the environment from a plurality of interference source and provide inputs to a configuration of adaptive canceller loops. The loops are connected to provide independent samples of the interference environment from each of the signal channels. In a canceller system, each of the independent loop outputs aree then used as an input to a canceller loop in the main channel to cancel interference in the receiving system. By using the independent samples, a receiving system can significantly increase interference cancellation and reduce the number of recirculations or iterations required.

17 Claims, 2 Drawing Figures

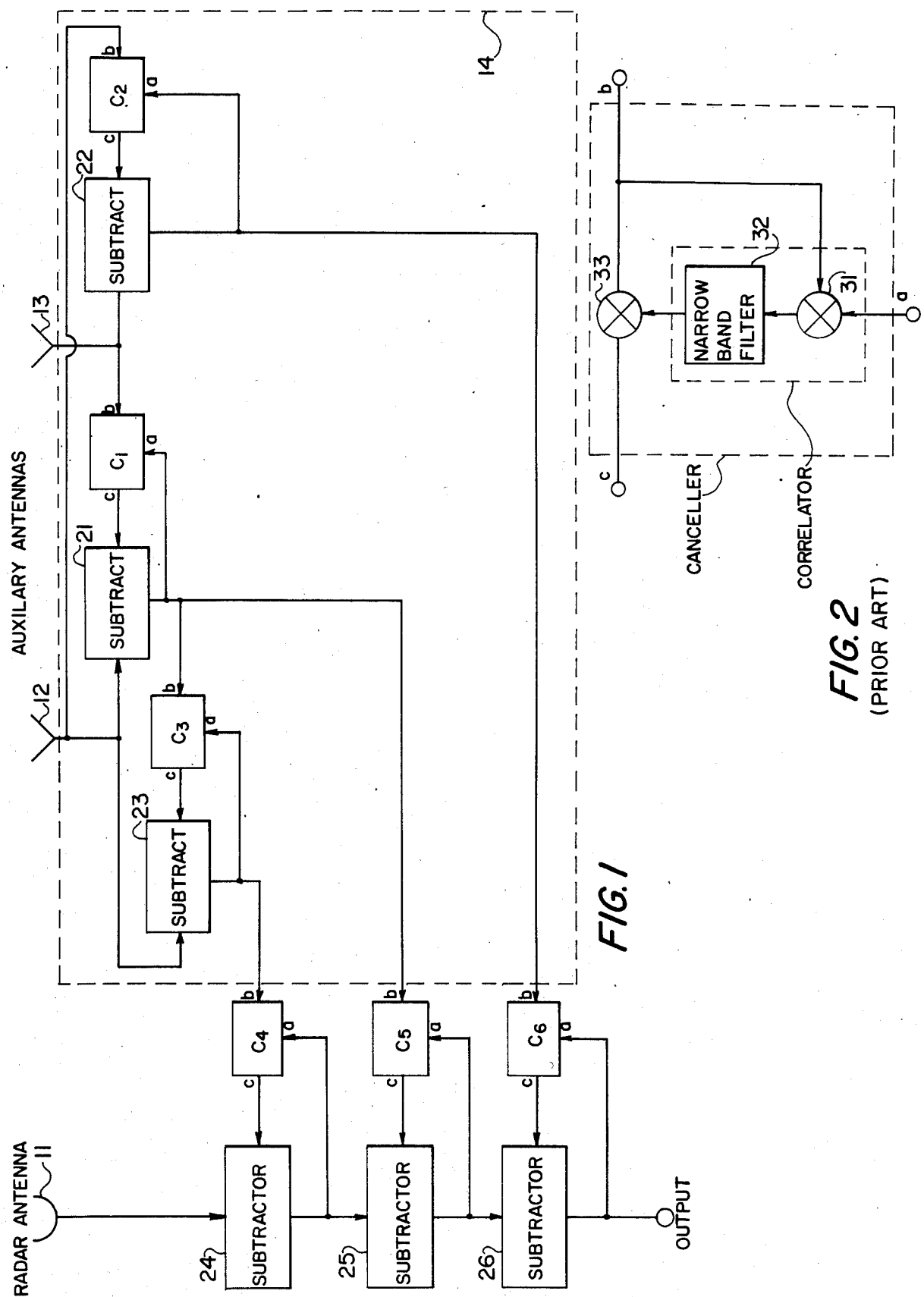

ADAPIVE SIDELOBE CANCELLER SYSTEM

BACKGROUND OF THE INVENTION

The present invention relates to improvements in signal processing systems and more particularly to improved techniques and devices for providing independent samples from a multiple signal environment.

Generally, signal processing systems are designed to separate desired information from unwanted information for evaluation. As is known in the art, in a system such as a radar system, the characteristics of the receiving antenna are such that the desired signal in the main-lobe cannot be distinguished from undesired signals in the side-lobes. This allows an interference (jammer) source to effectively mask the information contained in a radar signal.

Conventionally, side-lobe canceller systems have been used to eliminate the interference by using auxiliary antennas spaced about the radar antenna to sample the interference environment in which the in radar is operating. As taught by patent 3,202,990 to Paul W. Howells, each auxiliary channel signal is utilized by a canceller loop which measures the correlation between its auxiliary signal and the radar output. Each canceller loop then uses the measured correlation to phase shift and attenuate its auxiliary signal, and subtracts the resultant from the radar output at a point ahead of where it measures the correlation. In so doing, the canceller loop attempts to decorrelate the subtractor output from its auxiliary signal and provide a radar output substantially free from interference.

In systems exposed to only one interference source and having one canceller loop, conventional cancellers work well since the only way the correlation can go to zero is for the magnitude of the correlated component out of the subtractor to go to zero. However, when more than one interference source is involved, conventional cancellers cannot work well even though multiple canceller loops are employed. The problem encountered when multiple interference sources are present is that the measured correlation in the canceller loops can go to zero because the vector sum of the correlation of the various jamming signals can go to zero with finite magnitude signals out of the subtractor. This situation prevents accurate cancellation and is considered to be a false zero.

In an attempt to eliminate false zeros and provide more accurate cancellation, the prior art utilized parallel recirculation canceller loops also shown by Howells. Such loops, however, are prone to instability because of the high dynamic ranges and high loop gains required for cancellation.

In copending U.S. Application No. 499,260 entitled "Improved Sidelobe Canceller System" to Bernard L. Lewis and Irwin D. Olin, and 499,374 entitled "Modified Sidelobe Canceller System" to Bernard L. Lewis, filed in the United States on even date herewith and assigned to the same assignee as the present application, iterative systems are disclosed which increase cancellation accuracy and prevent false zeros. The techniques, however, require many iterative loops in some situations, and if partially correlated auxiliary signals are present, are limited in cancellation by common false zeros.

Accordingly, the present invention has been developed to overcome the specific shortcomings of the above known and similar techniques and to provide independent samples, particularly for use in a canceller system.

SUMMARY OF THE INVENTION

It is therefore an object of the present invention to provide a signal processing system capable of providing independent samples of a signal environment.

Another object of the invention is to provide a canceller system for increasing cancellation of interference from multiple sources with any given number of auxiliary antennas and placement.

A further object of the invention is to provide a sidelobe canceller system which substantially reduces the number of false zeros and provides optimum cancellation.

Still another object of the invention is to provide a side-lobe canceller system which reduces the number of iterations or recirculations necessary for highly accurate cancellation of multiple source interference.

In order to accomplish the above and other objects, the invention provides a unique preprocessing system for providing a plurality of independent samples from a multiple source environment. In the present invention, each of a plurality of independent receiving channels are connected to receive signals from an equal number of signal sources forming the signal environment. Each channel is connected as input to an independent canceller loop where it is combined in the loop subtractor with a signal from another channel to decorrelate the subtractor output. By using all channels as inputs to canceller loops and subtractors for each other channel, the outputs result in independent samples of the signal environment. In a canceller system, each of the independent outputs are used as inputs to independent cancellor loops serially connected in the main channel, and each operates on the signal in the main channel to remove only those components corresponding to the particular sample input to the loop. Since each sample is independent of the next, and since each canceller loop operates on the residue of the previous, the signal output in the main channel is progressively reduced, with a minimum number of canceller loops, until complete cancellation is obtained. The independent nature of each sample insures that false zeros are eliminated when the number of receiving channels (auxiliary) equals or exceeds the number of sources (e.g. jammers) forming the signal environment.

Other objects, advantages, and novel features of the invention will become apparent from the following detailed description of the invention when considered with the accompanying drawings wherein:

FIG. 1 is a schematic diagram of the preprocessing and canceller system according to the present invention.

FIG. 2 is a schematic diagram of one form of conventional canceller known to the prior art.

DETAILED DESCRIPTION

Referring to FIG. 1, a schematic diagram shows a preferred embodiment of the preprocessing and canceller system according to the present invention. In the present example, the invention will be described with reference to a radar system having a main directional radar antenna 11 and two auxiliary omnidirectional antennas 12 and 13. Although only two auxiliary antennas are shown, it is within the teachings of this invention to provide as many additional auxiliary antennas as may be required. The main radar antenna 11 forms the main channel for receiving radar signals and any interference that may be present. The auxiliary antennas 12 and 13 receive primarily interference and form the independent receiving channels for sampling interference from a plurality of sources. For simplicity, the radar and auxiliary receivers have been omitted in the drawing since they are unnecessary for an understanding of the inventive principle, it being obvious that such receivers are incorporated to receive the antenna signals in a manner well known in the art. The signals at antennas 12 and 13, after passing through the auxiliary receivers, are coupled to independent canceller loops including $C_1$-$C_3$ as shown in the drawing. Antenna 12 is coupled to supply its signal to subtractors 21 and 23 and the input b of canceller $C_2$. Antenna 13 is coupled to supply its signal to subtractor 22 and to the input b of canceller $C_1$. The output of subtractor 21 in turn is coupled as input b to canceller $C_3$. Each canceller $C_1$-$C_3$ is coupled to receive input at a from its respective subtractor output of subtractors 21-23. The output c of each canceller is in turn coupled as the second input to its respective subtractors to complete the canceller loop. The outputs from the canceller loops taken at the outputs of subtractors 21-23 produce independent samples by the preprocessing of the $C_1$-$C_3$ canceller loops. The preprocessing system is generally designated at 14.

In the main channel, the signals at antenna 11, after passing through the radar receiver (not shown) are coupled to canceller loops $C_4$-$C_6$. Antenna 11 is coupled to supply its signal to one input of subtractor 24 which in turn is coupled to supply its output to one input of subtractor 25, which likewise, is coupled to supply its output to one input of subtractor 26. In a manner similar to the $C_1$-$C_3$ canceller loops, the outputs of subtractors 24-26 are coupled as inputs a to cancellers $C_4$-$C_6$. The outputs c from each of the cancellers are in turn coupled as the second input to their respective subtractors to complete each of the canceller loops. The previously derived outputs from subtractors 21-23 forming the preprocessing system are also coupled as inputs b to cancellers $C_4$-$C_6$. While the outputs from subtractors 21-23 are coupled in a particular order to cancellers $C_4$-$C_6$, it is noted that any order than that shown could be used as long as all independent outputs from the preprocessing cancellers are coupled to an independent canceller loop in the main channel. It should be additionally noted, that regardless of the number of cancellers loops in the main channel, the subtractor output of the previous loop forms an input to the subtractor of the next successive loop.

Turning now to FIG. 2, a common canceller is shown as an example of a canceller that might be used in the present invention. The construction and operation of such a canceller is well known as taught by the patent to Howells 3,202,990, reference to which is hereby made, and will therefore not be discussed in great detail. Generally, however, the canceller is constructed from a mixer or multiplier 31 having inputs from a and b and an output connected through narrow band filter 32. The output from the narrow band filter 32 is then connected as an input to mixer or multiplier 33 along with the input from b. As can be seen from the drawing in FIG. 1, the subtractor output generally forms one input to the canceller at a, while the other signal is provided at b. The output c is then used as input to the subtractor to complete the canceller loops. As is well known, the mixer 31 and narrow band filter 32 form a correlator which produces a weighting function designed to equalize the phase and amplitude of the signal input at b in mixer 33, and provides an output c for decorrelating the signal out of its respective subtractor. As is also known, since the speed of response of the canceller loop is proportional to loop gain, and since loop gain is proportional to average power at input a, a loop will tend to cancel signals such as jamming signals having high average power, while being relatively insensitive to signals such as radar target returns. While the particular canceller of FIG. 2 has been referred to, by way of example in forming the canceller loop, it should be realized than any well known canceller construction designed to form an adaptive loop for decorrelating signals, could be used in its place. In the present example, it is also obvious that if the particularly illustrated canceller of FIG. 2 is used to form the canceller loops, the additionally required structure for filtering and offsetting the signal frequencies, as taught by Howells, must also be provided.

The operation of the inventive system will now be described with reference to FIG. 1. When a plurality of signal sources (in this case, jammers or interference sources) are present, the signal received by the radar antenna includes a radar signal carrier modulated by the radar signal and a plurality of jammer carriers having the same frequency, but different amplitude and phase, modulated by the jammer waveforms. Assuming that two independent, uncorrelated, high duty cycle interference sources are operating in the vicinity of the radar, the radar antenna 11 as well as both omnidirectional antennas 12 and 13 will receive the signals from both sources. The two auxiliary antennas sample the jamming environment and receive signals that can be broken down into three basic parts: (1) the part of a signal that is correlated on the two antennas, (2) the part of a signal on antenna 12 that is uncorrelated with that on antenna 13, and (3) the part of a signal on antenna 13 that is uncorrelated with the signal on antenna 12. These three portions are all independent portions that can be derived when two auxiliary channels are used, but as long as the number of auxiliary channels equals or exceeds the number of jammers, the number of independent samples needed for complete cancellation can be obtained.

In order to derive the three independent samples of the jamming environment from the signal from each of the two auxiliary antennas, the invention employs three adaptive loops (canceller loops) shown by the connections of $C_1$ and subtractor 21, $C_2$ and subtractor 22, and $C_3$ and subtractor 23. The adaptive loops, as has been noted, are conventional side-lobe canceller loops which decorrelate the output of the subtractor of each loop from the auxiliary input signal at b of each loop. In the present case, the adaptive loop including $C_1$ and its subtractor 21 produce the part of the signal on auxiliary antenna 12 that is uncorrelated with the signal on auxiliary antenna 13 and provides this part at the output of subtractor 21. In a similar manner, the adaptive loop including $C_2$ and its subtractor 22 produce the part of the signal on auxiliary antenna 13 that is uncorrelated with the signal on auxiliary antenna 12 and provides this part at the output of subtractor 22. Finally, the adaptive loop including canceller $C_3$ and its subtractor 23 produce the part of the signal on auxiliary antenna 12 that is correlated with the signal on auxiliary antenna 13 and provides that part as the output of subtractor 23. As can be seen, these three outputs from subtractors 21-23 now form three independent samples, as previously described, from the preprocessing system 14, and are ready for use as auxiliary inputs to a serially connected side-lobe canceller.

The side-lobe canceller of the present invention employs three adaptive loops shown by the connection of $C_4$ and its subtractor 24, $C_5$ and its subtractor 25, and $C_6$ and its subtractor 26. Again, the adaptive loops are conventional side-lobe canceller loops which decorrelate the output of the subtractor of each loop from the auxiliary input signals at b of each loop. However, contrary to prior art practice, the adaptive loops of $C_4$–$C_6$ are independent and serially connected, as shown by the drawing, and utilize the preprocessed independent inputs from subtractors 21–23 as inputs b to cancellers $C_4$–$C_6$. Each adaptive loop therefore operates to decorrelate the output of its subtractor from one of the three independent samples using the main channel signal as the initial subtractor output. Since the three independent samples constitute all possible parts of the interference in the main channel, the successive operation of each adaptive loop on the output residue of the previous loop allows complete cancellation of the interference signal.

In contrast to the prior art where each loop operated in parallel on the entire signal from each auxiliary antenna, and in the process allowed one loop to introduce components that had to be taken out by another loop, the present invention provides independent signal components that only allow each adaptive loop to decorrelate those particular components, thereby eliminating loop opposition and recirculation. By avoiding the introduction of opposing components, the present technique eliminates the need for multiple iterations in systems as described in the application to Bernard L. Lewis and Irwin D. Olin. In addition, since the independent samples constitute all the information necessary for successive decorrelation of the main channel signal through subtractors 24–26, complete cancellation can be obtained for at least as many jamming signals as there are auxiliary antennas, along with the elimination of false zeros and only a minimum of adaptive loops.

In a simulated test of the present invention, two jamming sources were used with one source located in a null of the radar antenna pattern. Conventionally, this arrangement results in incomplete cancellation in the main radar channel. However, in the present system, with the auxiliary antennas spaced such that one interference signal had a phase of $+45°$ and $+90°$ in antennas 12 and 13 respectively, and the other had a phase of $-45°$ and $-90°$ in antennas 12 and 13 respectively, and with the radar antenna taken as the zero phase center, complete cancellation of the interference in the main channel was obtained.

From the above disclosure, it is clear that the present invention provides many advantages over known systems. Using only conventional adaptive loops, the signals from a plurality of receiving channels can be preprocessed to be independent of one another. These preprocessed signals can in turn be used as inputs to a side-lobe canceller system using serially connected adaptive loops. This results in a canceller system that provides optimum cancellation for a plurality of interference signals while reducing false zeros and eliminating the need for multiple iterations or recirculations. All of these are new features that are not found in conventional systems as previously mentioned.

While the invention has been described with particular reference to a radar system, it is clear that the present teachings are applicable to any cancellation system or any processing system requiring independent data samples. In addition, while the independent sample involving the correlated components was obtained using the adaptive loop including canceller $C_3$, it is possible to use the output of one or more of the auxiliary antennas in place of the output of that adaptive loop. Further, while only two auxiliary antennas have been used as signal receiving channels, it is obvious from the inventive teachings that more could be used with additional adaptive loops to provide additional independent samples.

Obviously many other modifications and variations of the present invention are possible in light of the above teachings. It is therefore understood that within the scope of the appended claims the invention may be practiced otherwise than as specifically described.

What is claimed and desired to be secured by Letters Patent of the United States is:

1. A system for preprocessing signals of a multiple signal environment having desired and undesired signals comprising:
   a plurality of independent channel means for receiving undesired signals from a multiple signal environment and providing a plurality of output signals;
   first means coupled to said channel means for decorrelating each of said channel output signals from the others to produce a plurality of independent samples; and
   second means coupled to at least one of said channel means for providing a sample of a signal component correlated on all of said channel means.

2. The system of claim 1 wherein said first means comprises a plurality of canceller loops with each loop of said plurality of loops coupled to receive a first input signal from one of said channel means and a second input signal from a different one of said channel means and provide a decorrelated output signal representing one of said independent samples.

3. The system of claim 2 wherein each loop is connected to receive the first input signal from a channel means different than the channel means supplying the first input signals of all other loops of said plurality of loops.

4. The system of claim 3 wherein each of said canceller loops comprises, a canceller means coupled to receive and correlate components of said first and second signal to produce a correlated output and subtractor means coupled to subtract said correlated output from said first signal to provide said one of said independent samples, each of said canceller means being coupled to the output of its subtractor means to receive the subtractor output signal as said first signal.

5. The system of claim 4 wherein each of said channel means comprises an antenna for providing an output signal from the multiple signal environment.

6. The system of claim 5 wherein each antenna is an omnidirectional antenna.

7. The system of claim 1 further including:
   a main channel means for receiving desired and undesired signals from the multiple signal environment and providing a main channel signal; and
   means coupled to said main channel means and to said first means and said second means for comparing the undesired signals in said main channel signal with each of said samples and providing cancelling signals which reduce the undesired signals in said main channel signal.

8. The system of claim 7 wherein said means for comparing comprises a plurality of canceller loops with a plurality of said loops coupled to said first means in such a manner that each of said loops has an input from said main channel signal and input from an independent sample and provides a main signal output reduced in undesired signals and one of said loops is coupled to said second means in such manner that it has an input from said main channel signal and input from said second means sample and provides a main signal output reduced in undesired signal.

9. The system of claim 8 wherein each loop is connected to receive an input sample different from the input samples of all other loops of said plurality of loops.

10. The system of claim 9 wherein each of said canceller loops comprises, canceller means coupled to compare the undesired signal in the main channel with its respective sample and provide one of said cancelling signals and a subtractor means coupled to receive the main channel signal and subtract the cancelling signal therefrom to form said main signal output.

11. The system of claim 10 wherein each of the canceller means of each canceller loop is connected to receive the output of its own subtractor means as the main channel signal to thereby form a plurality of independent canceller loops.

12. The system of claim 11 wherein a subtractor means of one of the canceller loops is connected to receive said main channel signal from said main channel means, and each of the remaining subtractor means are serially connected such that the output from the previous subtractor means forms the main channel signal input to the next succeeding subtractor means until all of said subtractor means have been utilized.

13. The system of claim 12 wherein said first means comprises a plurality of canceller loops with each loop coupled to receive a first input signal from one of said channel means and a second signal from a different one of said channel means and provide a decorrelated output signal representing one of said independent samples.

14. The system of claim 13 wherein each loop of said first means is connected to receive the first input signal from an independent channel means different than the independent channel means supplying the first input signals of all other loops of said first means.

15. The system of claim 14 wherein each of said canceller loops of said first means comprises, a canceller means coupled to receive and correlate components of said first and second signal to produce a correlated output and subtractor means coupled to subtract said correlated output from said first signal to provide said one of said independent samples, each of said canceller means of said first means being coupled to the output of its subtractor means to receive said subtractor means output as said first signal.

16. The system of claim 15 wherein each of said channel means comprises an antenna for providing the channel output signal.

17. The system of claim 16 wherein the main channel antenna is a directional antenna and said independent channel antennas are omnidirectional antennas.

* * * * *